Dec. 8, 1964
C. H. REX ETAL
3,160,350
STREET LIGHTING LUMINAIRE
Filed June 1, 1960
4 Sheets-Sheet 1
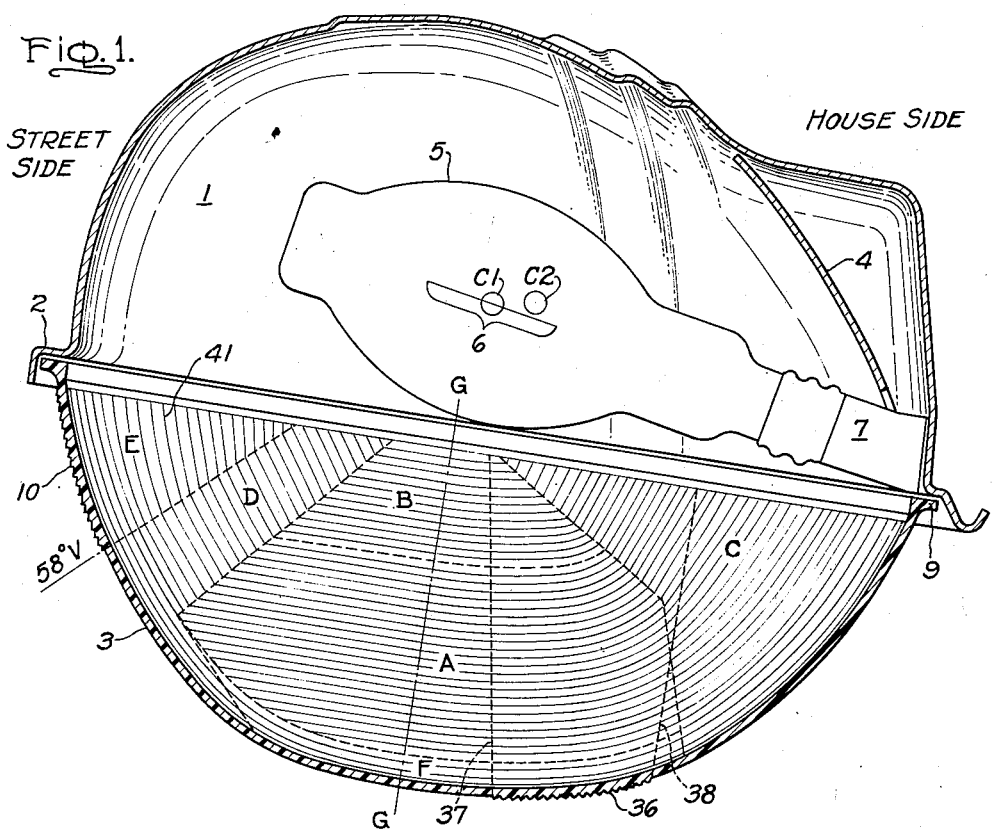
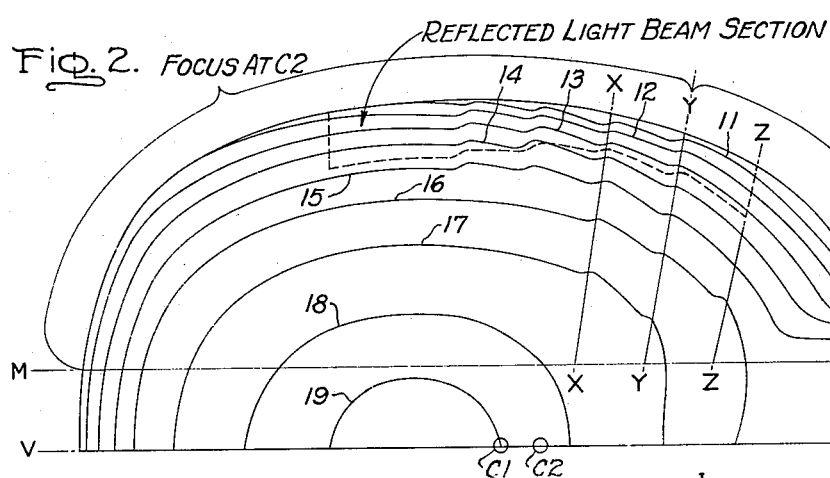
Inventors:
Charles H. Rex
David L. Wood
by Otto Tichy
Their Attorney

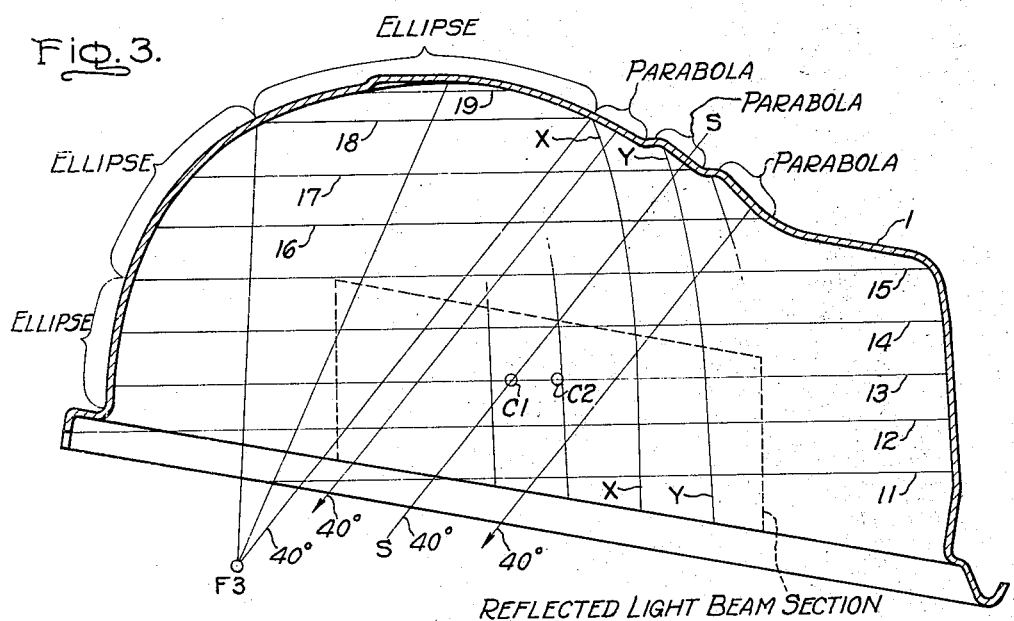
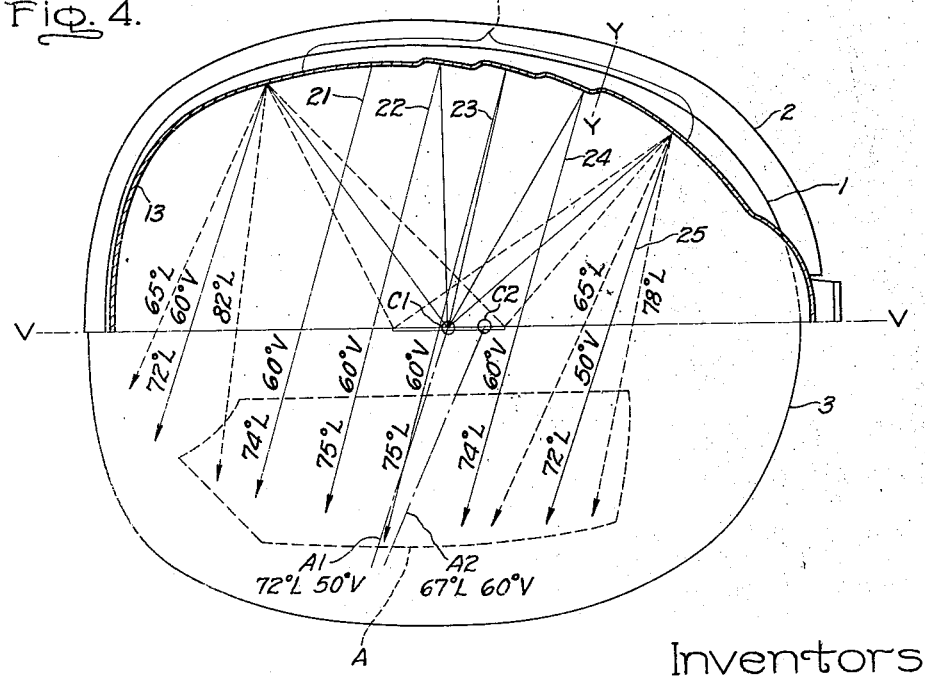
Inventors:
Charles H. Rex
David L. Wood
by *Otto Fichy*
Their Attorney Inventors:
Charles H. Rex
David L. Wood
by Otto Tichy
Their Attorney Dec. 8, 1964    C. H. REX ETAL    3,160,350
STREET LIGHTING LUMINAIRE
Filed June 1, 1960    4 Sheets-Sheet 4
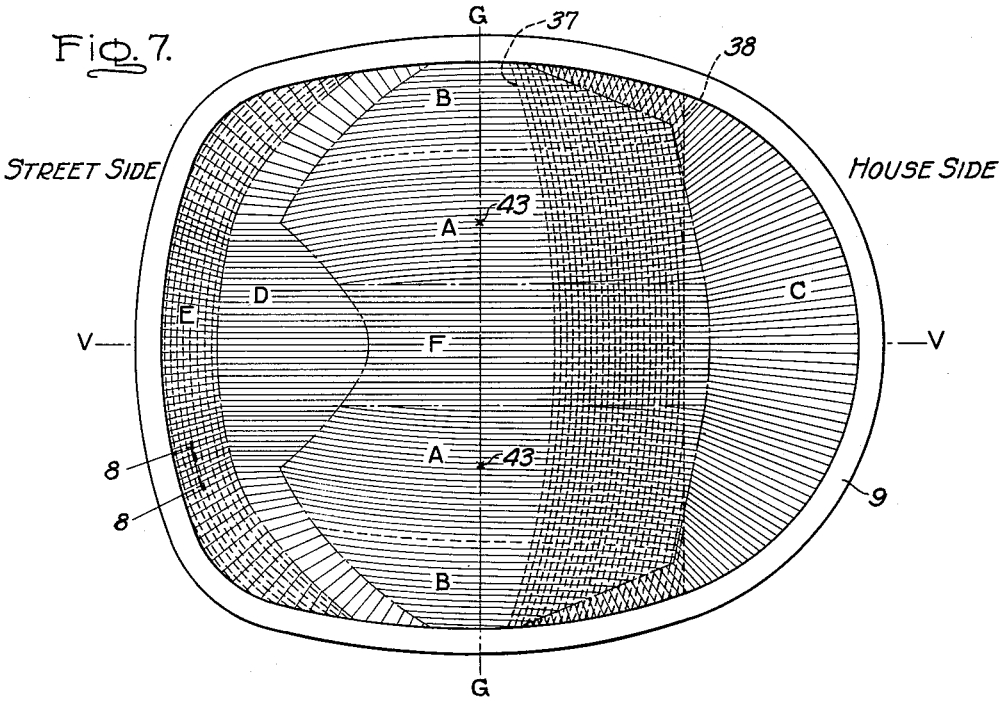
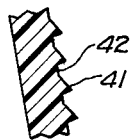
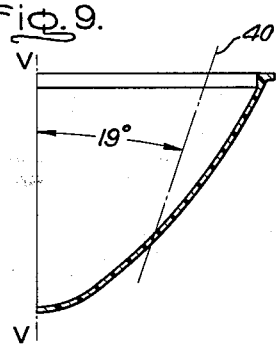
Inventors:
Charles H. Rex
David L. Wood
by  Otto Tichy
Their Attorney

United States Patent Office 3,160,350
Patented Dec. 8, 1964

3,160,350
STREET LIGHTING LUMINAIRE
Charles H. Rex and David L. Wood, Hendersonville, N.C., assignors to General Electric Company, a corporation of New York
Filed June 1, 1960, Ser. No. 33,183
3 Claims. (Cl. 240—106)

This invention relates to luminaires, and more particularly to street or roadway luminaires of the enclosed type including an upper bowl-shaped reflector and a lower bowl-shaped refractor closing the mouth of the reflector. Still more particularly, the invention relates to luminaires for disposition at one side of a roadway wherein it is necessary to provide a roadway lighting pattern which is asymmetric with respect to a line parallel to the road and passing through the nadir.

To provide an asymmetric pattern it has heretofore been proposed to provide a side-mounted luminaire having an ovate horizontal configuration. By disposing such an ovate luminaire at one side of the road with its larger end facing the road, the converging side portions of the reflector direct a large portion of the available light flux into a pair of main oblique light beams directed toward and along the roadway in opposite directions.

In accordance with the present invention, the asymmetric characteristic of an ovate luminaire is utilized more efficiently by virtue of a novel configuration of the refractor. It is accordingly an object of the invention to provide a refractor having portions thereof so configurated as to supplement the main beams in a manner to provide uniformity of illumination on the street and improved efficiency of utilization of the emitted light.

The novel features of the refractor are pointed out with particularity in the appended claims and will be further understood from the following description taken in conjunction with the drawing wherein:

FIG. 1 is a vertical cross-sectional view of a luminaire including a refractor constructed in accordance with our invention;

FIG. 2 shows the horizontal contours of the reflector in FIG. 1 at equal vertical spacings, it being understood that the contours are symmetrical on opposite sides of the vertical median plane V—V;

FIG. 3 is a vertical cross-sectional view of the reflector taken along line M—M of FIG. 2;

FIG. 4 is a top view of the luminaire shown in FIG. 1 showing one-half the reflector in a horizontal cross-section through its focal centers C1 and C2, and one-half the refractor in plan view and illustrating the paths of certain representative reflected light rays;

FIG. 7 is a plan view of the refractor looking down into the interior thereof;

FIG. 8 is a fragmentary horizontal section through a portion of the area E of the refractor at 8—8 in FIG. 7; and FIG. 9 is a transverse cross-section through one-half of the refractor along the line G—G in FIG. 7.

Figure 5:
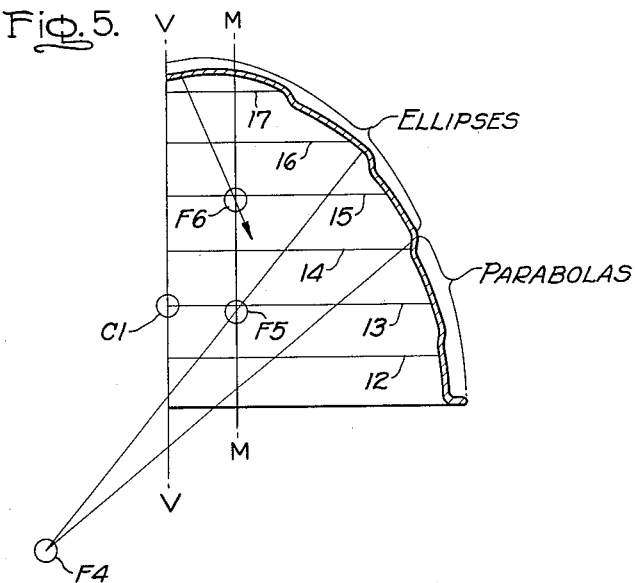
FIG. 5 is an inclined plane light ray diagram taken on line S—S of FIG. 3.

Referring to the drawings, there is shown in FIG. 1 the essential optical parts of a complete luminaire including a downwardly concave reflector 1 having a down-turned open mouth defined by rim 2 and which is of a generally ovate configuration. Disposed below and closing the mouth of the reflector is a bowl-shaped prismatic globe or refractor 3 of light transmitting material such as glass or, preferably, an organic plastic such as an acrylic resin. To fill in the rear part of the reflector where an enlarged end portion is provided for the attachment of a slip fitter, an inserted reflector section 4 is placed with an optically correct configuration. Mounted within the reflector-refractor combination is, in the illustrated embodiment, a mercury vapor lamp 5 of a common type shown only in outline and having an elongated arc type light source, the limits of which are defined by bracket 6.

As illustrated herein, the reflector 1 is of a type disclosed and claimed in application Serial No. 815,710 of Charles H. Rex, filed May 25, 1959. The said reflector 1 is contoured to possess two distinct focal centers C1 and C2 spaced apart from each other a horizontal distance longitudinally of the luminaire to provide two different standard light distributions from the same luminaire. The socket 7, which supports the lamp 5, positions the light source so that its center coincides with one of the two focal centers C1 and C2. When the light center is located at the focal center C1 closer to the street side of the luminaire there is produced an oblique pair of comparatively narrow beams directed in opposite directions along the roadway to provide an ASA Type II light distribution. By substituting a shorter socket assembly 7 the center of the light source is shifted rearward to the focal center C2 located closer to the house side of the luminaire to provide an ASA Type III light distribution in which the oblique light beams are directed further out into the roadway pattern.

In the example shown in FIG. 1 the luminaire is positioned with its elongated light source tilted up toward the roadway at an acute angle to make better use of the candle power and lumen output of mercury arc lamps which is highest at angles perpendicular to the lamp axis. With the tilted light source and the reflector opening inclined, more of the direct and reflected light can be directed into the roadway pattern and a desirable low angle of cut-off is obtained on the house side of the luminaire. The slanted angle of reflector cut-off is preferably about 10° from the horizontal, and the light source is preferably inclined at an angle of about 10 to 20° from the horizontal.

The refractor 3, of course, acts over its entire area on direct light from the source. It is sectionalized, however, in such a way that certain areas are designed primarily to accommodate direct light from the source while others are intended principally for the redirection of reflected light. Each of the main light beams is made up principally of a reflected light beam and a direct light beam. The portions of the refractor through which are transmitted these two principal component beams are shown in FIGS. 1 and 7. The portions of the refractor enclosed in dotted lines and designated A comprise a series of prisms on the internal surface of the refractor running generally longitudinally thereof and designed principally to raise the vertical angle of the reflected light beam incident thereon with only nominal lateral redirection. Above the reflected light beam area A, at each side of the refractor, is a light source beam area B of prisms on the internal portion of the refractor which primarily function for the vertical redirection of direct light incident thereon. The prisms in light source beam area B run generally longitudinally of the refractor to lift source light at varying angles into the light source beam. To do this the vertical redirection of the prisms is increased as the vertical angle of light from the source decreases.

Referring more particularly to the reflected light beam areas A, the prisms are designed to redirect the reflected beam light by lifting it 15° into the main beam. These prisms are of constant lifting action since the incident reflected light is at a constant angle. The prisms in areas A toward the street side of the transverse plane G—G lie in parallel horizontal planes. At the house side of areas A from plane G—G, the prisms curve upward to give a steadily increasing forward bending action while decreasing the lift. As illustrated in FIG. 9 by the directional line 40, those prisms lie in parallel planes at an angle of 19° to the vertical median plane V—V.

Referring more particularly to the light source beam areas B, the prisms are designed with varying lifting action, ranging from about 9° to about 20° from top to bottom, to redirect the source light at a constant angle into the main beam. In that portion of areas B towards the street side of the transverse plane G—G, those prisms lie in parallel horizontal planes. Toward the house side of the plane G—G, those prisms curve upwardly to give a steadily increasing forward bending action while decreasing the lifting action.

The prisms in the house side area C bend the direct light laterally up and down the street without being so steep as to block the light. Allowing the light to pass through provides illumination on the street under and behind the luminaire which is sometimes a considerable distance from the curb. This additional house side light provides an increase in overall efficiency. These prisms extend around the entire house side and into a triangular area above the reflected light beam section A and to the house side of the light source beam section B to avoid reflected light and provide increased lateral redirection for source light. These prisms lie in vertical radial planes, the said planes being radial about the intersection of plane V—V and plane G—G which is perpendicular to the refractor rim 9.

To prevent too much light from being wasted beyond the far side of the roadway, a visor shaped area E of light depressing external prisms 10 (FIG. 1) is provided on the street side of the refractor. The lower boundary of this area is constituted by the intersection of the front or street side of the refractor by an inclined plane (about 58° from the vertical) passing upward through the general region occupied by the light source and intersecting the curb line at the far side of the road, and is partially responsible for a generally rectangular pattern of light distribution on the far side of the roadway within the pavement line. The said prisms 10 lie in planes parallel to the said lower boundary.

In accordance with the present invention, this external prism action is supplemented by internal prisms in this area E. The said internal prisms 41 lie in vertical planes which are radial about the intersection of planes V—V and G—G. As shown in FIG. 8, these internal prisms 41 are separated by flat strips 42 which permit some of the direct light to pass directly through area E without lateral bending. Due to limitations in the amount of bending or depressing action obtainable from prisms 10, especially at the upper portions of the area E, some of the light passing therethrough can be depressed only part way toward the opposite pavement line. That light is brought within the pavement line by the lateral bending action of the internal prisms 41.

The prisms in area D, between the visor area E and the main beam areas A and B, laterally redirect incident light from the source and from the reflector into the desired width of the roadway pattern. This light would otherwise fall beyond the roadway pattern on the street side. The prisms in the central enlarged portion of area D lie in parallel vertical planes. The prisms in each of the narrow side portions of area D lie in vertical planes which are radial about the points 43 (FIG. 7). The said prisms in the central portion of area D are also separated by flat strips (the same as prisms 41 in area E) to allow a portion of the light to illuminate the area directly in front of the luminaire.

In area F at the keel of the refractor the prisms lie in parallel vertical planes. These prisms provide a variable lifting action to either side of the median plane V—V and thereby provide a two-way action most properly suited to the light from the source and from the upper top portion of the reflector. This action avoids excessive light directly below the luminaire and thereby contributes to uniformity of light distribution.

Toward the house side of the refractor there is a band of external prisms 36 which run around the refractor in vertical planes between the boundaries 37 and 38. These prisms lie in planes which are parallel to each other and parallel to the plane of boundary 37 which is inclined 10° from the perpendicular to the plane of the refractor rim 9 so as to be vertical when the refractor 3 is mounted in its 10° upwardly tilted operative position as shown in FIG. 1. These prisms primarily receive direct light. However, a portion of the reflected light from the rear reflector section enters these prisms near the keel. These prisms are designed for moderate lateral bending with their nonworking faces designed for direct light. Their purpose is to transfer some of the house side light to the street side, thereby increasing street side utilization.

The complete refractor 3 is composed of curving or arcuate prisms to give a smooth transition between its areas, the overall result being uniformity of illumination on the roadway and higher possible efficiency.

On the reflector 1, as it is shown in FIGS. 2 and 3, the dotted lines enclose the approximate portion of the lateral reflector surface which reflects light toward the reflected light beam area A of the refractor. This portion of the reflector, known as the reflected light beam section, is the main factor in the establishment of the lateral width of the main beam to provide either Type II or Type III lateral distributions.

In FIG. 2 are shown the lateral contours at each of several horizontal planes numbered respectively 11 through 19 which intersect the inside reflecting surface at vertical spacings, most of which are equal. These horizontal planes are identified by the same numbers in FIG. 3. Certain discontinuities or indents can be observed between adjacent portions occurring along major indentation lines X—X, and Y—Y and along lesser indentations on either side of them including Z—Z.

Within the reflected light beam sections of the reflector each of the contours is parabolic both in horizontal and in vertical section. Forward of the line Y—Y on either side of the reflector, each of the reflector curvatures has its focus at the house side light center C2, while the reflector curvatures to the rear of this line have their foci at the street side light center C1.

Most of the reflector contours above and in front of the reflected light beam section are elliptical, as demonstrated by the reflected light rays in FIGS. 3 and 5. The top portion of the reflector throws reflected light downward and forward and is generally of elliptical contour in vertical and horizontal sections, with a principal focus at C1 and conjugate foci such as F3, F4, F5 and F6 spaced from and about the light source. The end portions of the reflector are elliptical in horizontal and vertical sectional contour. The house side end portion of the reflector reflects light downward and forward through the mouth of the reflector, and the street side end portion throws light downward and to the rear through the mouth of the reflector. At the top of the reflector on the house side, the reflector curvatures in longitudinal vertical planes are generally parabolic to reflect light generally downward and forward at vertical angles of about 40°.

FIG. 4, with its reflected light ray diagram, illustrates the effect of locating the center of the light source at the Type II focal center C1. A1 represents the common parabolic axis of the rearmost or house side portion of the reflected light beam section, while A2 designates the common parabolic axis for the reflected light beam section on the street side of Y—Y. The representative light rays 21 through 24 reflected from the reflected light beam section are directed at nearly parallel lateral angles of 74° and 75°.

To obtain a Type III distribution, the light source is shifted rearward to place its center at the light center position C2. In this case each of the rays reflected from the reflected light beam section is shifted forward farther out into the roadway pattern at lateral angles of about 67° before redirection by the refractor.

Figure 6:
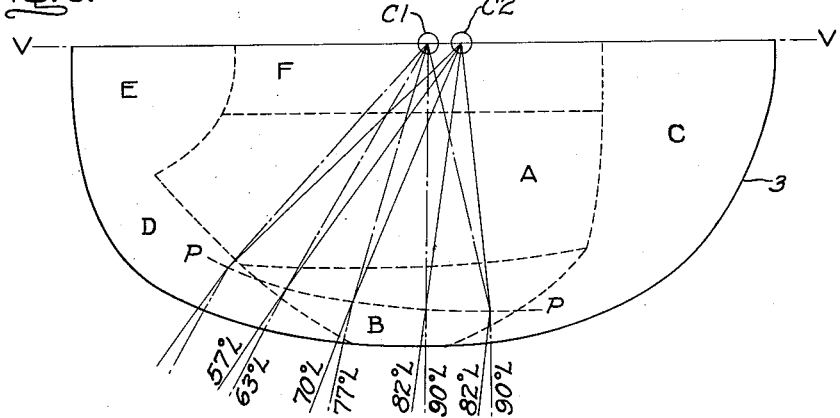
FIG. 6 is a top plan view of one-half of the refractor illustrating its action on the direct light beam from sources located at the light centers C1 and C2.

FIG. 6 represents the effect on the light source beam of the location of the lamp at the Type II and Type III positions C1 and C2. Representative direct light rays from each of the focal centers C1 and C2 are shown incident on the light source beam area B along a horizontal intersecting plane P—P. It is to be observed that each point on the surface of the refractor transmits the direct light passing therethrough at different lateral angles depending upon the position of the light source. The rearmost light rays designated 82° lateral and 90° lateral include the additional redirection accomplished by the band of external prisms 36.

When the light source center is at C2, light from the source is directed farther out into the roadway pattern than it is when the light source center is at C1. With this arrangement, the reflected light beam cooperates efficiently with the light source beam to produce a combined main beam directed at appropriate lateral angles whether for Type II or for Type III distributions. Portions of the roadway other than those illuminated by the main beams are uniformly illuminated at high efficiency by the combined action of the upwardly sloping prisms at the house side of areas A and B, the external and internal prisms in the visor area E, the laterally redirecting prisms in area D and the laterally redirecting prisms in the house side area C.

What we claim as new and desire to secure by Letters Patent of the United States is:

1. In a street lighting luminaire adapted to be positioned at one side of a roadway, an ovate bowl-shaped refractor symmetrical about a vertical median plane and having prismatic areas defining reflected light beam areas on lower opposite sides thereof and light source beam areas above and contiguous to said reflected light beam areas, the prisms in the forward or street side portions of the aforesaid areas lying in planes parallel to the rim of the refractor and designed to lift light incident thereon, the prisms in the rearward or house side portions of the aforesaid areas lying in parallel planes and curving upward toward said rim to provide a steadily increasing forward bending action while decreasing the lifting action, a visor-shaped area at the street side of the refractor spaced from said reflected light beam and light source beam areas, said visor-shaped area having external depressing prisms and internal lateral bending prisms which lie in vertical planes radial about the intersection of the median plane with a transverse plane perpendicular to the refractor rim and near the center of the refractor, an intermediate area between said visor-shaped area and said reflected light beam and light source beam areas and including a center portion adjacent the longitudinal center line of the refractor and side portions extending upward to the refractor rim, said center portion having prisms lying in parallel vertical planes and said side portions having prisms lying in vertical planes which are radial about respective points substantially on said transverse planes opposite the edges of said center portions, the prisms in said intermediate area being arranged to bend light laterally to respective sides within the roadway pattern, and an area at the house side of the refractor contiguous to the reflected light beam and light source beam areas having prisms which are in vertical planes radical about the intersection of said median and transverse planes to bend light laterally up and down the roadway.

2. In a street lighting luminaire adapted to be positioned at one side of a roadway, an ovate bowl-shaped refractor symmetrical about a vertical median plane and having prismatic areas defining reflected light beam areas on lower opposite sides thereof and light source beam areas above and contiguous to said reflected light beam areas, the prisms in the forward or street side portions of the aforesaid areas lying in planes parallel to the rim of the refractor and designed to lift light incident thereon, the prisms in the rearward or house side portions of the aforesaid areas lying in parallel planes and curving upward toward said rim to provide a steadily increasing forward bending aciton while decreasing the lifting action, a visor-shaped area at the street side of the refractor spaced from said reflected light beam and light source beam areas, said visor-shaped area having external depressing prisms and internal lateral bending prisms which lie in vertical planes and radial about the intersection of the median plane with a transverse plane perpendicular to the refractor rim and near the center of the refractor, and an intermediate area between said visor-shaped area and said reflected light beam and light source beam areas and including a center portion adjacent the longitudinal center line of the refractor and side portions extending upward to the refractor rim, said center portion having prisms lying in parallel vertical planes and said side portions having prisms lying in vertical planes which are radial about respective points substantially on said transverse plane opposite the edges of said center portions, the prisms in said intermediate area being arranged to bend light laterally to respective sides within the roadway pattern.

3. A luminaire as set forth in claim 1 wherein the refractor further includes a band of external prisms toward the house side thereof and running around the sides and bottom of the refractor, said prisms being in parallel planes inclined slightly rearwardly from the vertical to the refractor rim and arranged to bend light incident thereon laterally along the roadway, said band overlapping part of the house side portions of said reflected light beam and light source beam areas and a contiguous portion of said house side area.

References Cited in the file of this patent

UNITED STATES PATENTS

| | | |
|---|---|---|
| 804,254 | Mygatt | Nov. 14, 1905 |
| 2,474,326 | Rolph | June 28, 1949 |
| 2,493,087 | Rolph | Jan. 3, 1950 |
| 2,566,126 | Franck | Aug. 28, 1951 |
| 2,721,931 | Franck | Oct. 25, 1955 |
| 2,739,226 | Rex | Mar. 20, 1956 |
| 2,945,945 | Rex | July 19, 1960 |

UNITED STATES PATENT OFFICE
CERTIFICATE OF CORRECTION

Patent No. 3,160,350  December 8, 1964

Charles H. Rex et al.

It is hereby certified that error appears in the above numbered patent requiring correction and that the said Letters Patent should read as corrected below.

Column 6, line 6, for "radical" read -- radial --; line 26, strike out "and".

Signed and sealed this 20th day of April 1965.

(SEAL)
Attest:

ERNEST W. SWIDER
Attesting Officer

EDWARD J. BRENNER
Commissioner of Patents